United States Patent [19]

Baima et al.

[11] Patent Number: 5,618,222

[45] Date of Patent: Apr. 8, 1997

[54] METHOD AND A MACHINE FOR WORKING A BLADE SECTOR

[75] Inventors: Antonio Baima, Nole; Giuseppe Borio, Turin; Mario Bo, Asti; Leonardo De Carlo, Moncalieri; Aurelio Berruto, Pino Torinese; Roberto Tolomei, Turin; Gianluigi Boscolo, Carmagnola, all of Italy

[73] Assignee: Fiatavio S.p.A., Via Nizza, Italy

[21] Appl. No.: 351,781

[22] Filed: Dec. 8, 1994

[30] Foreign Application Priority Data

Dec. 17, 1993 [IT] Italy .................................. 93A000963

[51] Int. Cl.⁶ ..................................................... B24B 19/14
[52] U.S. Cl. ..................................... 451/14; 451/5; 451/65
[58] Field of Search ............................... 451/1, 14, 9, 28, 451/130, 129, 139, 121, 5, 65

[56] References Cited

U.S. PATENT DOCUMENTS 2,600,591 6/1952 Wang .
3,785,245 1/1974 Streander .
4,813,187 3/1989 Mushardt .................................. 451/28
4,827,675 5/1989 Andrews .................................. 451/28

FOREIGN PATENT DOCUMENTS 24575964 8/1981 France .
2193455 2/1988 United Kingdom .

*Primary Examiner*—Robert A. Rose
*Attorney, Agent, or Firm*—Kinney & Lange, P.A.

[57] ABSTRACT

A blade sector has a plurality of blades and a circular body connecting the ends of the blades defining its own axis and is finished by the working of a lateral surface of the circular body itself; the working of the lateral outer surface is effected with the use of a disc tool having a shaped cutting surface by arranging the cutting surface of the disc tool in contact with the lateral surface and rotating the sector about an axis distinct from the axis of the circular body and, at the same time as the bladed sector is rotated, displacing the blade sector and the disc tool translationally relative to each other in two directions perpendicular to the first axis in such a way that a distance between the axis of the circular body and the instantaneous point of contact of the lateral surface with the disc tool is kept constant during the entire working of the lateral surface itself.

20 Claims, 3 Drawing Sheets

METHOD AND A MACHINE FOR WORKING A BLADE SECTOR

BACKGROUND OF THE INVENTION

The present invention relates to a method and to a machine for working a blade sector.

In the field of motors in general and in the aeronautic field in particular, it is known to use turbines which usually include a plurality of blade discs, each of which defines its own axis and is constituted by a plurality of blade sectors arranged alongside each other. Each blade sector includes a plurality of radial blades and, usually, two circular end bodies interconnecting opposite end portions of the blades themselves.

The working of each blade sector includes the finishing of the outer lateral surfaces of the said circular bodies and is currently effected with the use of machines each including a cutting head supporting a respective disc tool, generally a grinding wheel, and a worktable rotatable about its own axis.

In known machine tools, the tables are dimensioned so as to support and retain a plurality of blade sectors which are arranged on the table close together in an array so as to form a ring or half-ring of the blade sectors on an axis coincident with the axis of the table. At this point, the outer surface is worked by positioning the disc tool with its cutting surface in contact with the outer surface to be worked and simply rotating the table about its axis.

The method of working just explained, although used, has a major disadvantage of rendering the working large bladed sectors extremely difficult if not impossible. In fact, the positioning of the bladed sectors in the said array on the table necessarily involves the use of large-diameter tables with the result that the machine itself is very bulky.

Moreover the various sectors on the table must be mounted on the table extremely precisely and this necessitates not only rather long assembly times but also the use of relatively complex and expensive positioning equipment.

Finally, the method just explained is not very satisfactory in that any geometric and/or dimensional error made during the mounting of the sectors on the table or during the working of the sectors themselves results in the waste of all the sectors present on the table with very considerable losses both in terms of production and of material used.

SUMMARY OF THE INVENTION

The object of the present invention is to provide a method for working a blade sector.

According to the present invention there is provided a method for working a blade sector for forming part of a blade disc and including a plurality of blades and at least one circular, peripheral body connecting together corresponding ends of the blades, the circular body defining its own axis substantially perpendicular to the blades and arranged to coincide with an axis of the blade disc, the body having a lateral surface to be worked, coaxial with the said axes; the method including the steps of arranging a disc tool which is rotatable about its own axis in contact with the lateral surface and being characterised in that the blade sector is rotated about a first axis distinct from the axis of the circular body but parallel to the axis of the circular body, and in that, at the same time as the blade sector is rotated, the blade sector and the disc tool are displaced relative to each other along two lines of action perpendicular to the first axis in such a way that a distance between the axis of the circular body and the instantaneous point of contact of the lateral surface with the disc tool is kept constant during the entire working of the lateral surface itself.

The present invention also relates to a machine for working a bladed sector.

According to the present invention there is provided a machine for working a blade sector for forming part of a blade disc and including a plurality of blades and at least one circular peripheral body connecting together the ends of the blades, the circular body defining its own axis substantially perpendicular to the blades and arranged to coincide with an axis of the blade disc, the body having a lateral surface to be worked, coaxial with the said axes; the machine including a cutting head, a disc tool keyed to a shaft of the cutting head and rotatable about its own axis, a worktable rotatable about a first axis, and first actuator means for rotating the first worktable about the first axis, and being characterised in that the worktable is arranged to support a single blade sector to be worked, and in that it further includes a first slide and a second slide supporting the worktable and the cutting head respectively, second actuator means and third actuator means for driving the first slide and the second slide along a first line of action and a second line of action respectively perpendicular to the first axis, and electronic control means for simultaneously activating and controlling all the actuator means in such a way that a distance between the axis of the circular body and the instantaneous point of contact of the lateral surface with the disc tool is kept constant during the entire working of the lateral surface itself.

BRIEF DESCRIPTION OF THE DRAWINGS

The invention will now be described with reference to the appended drawings which illustrate one non-limitative embodiment, in which.

DETAILED DESCRIPTION OF THE INVENTION

Figure 1:
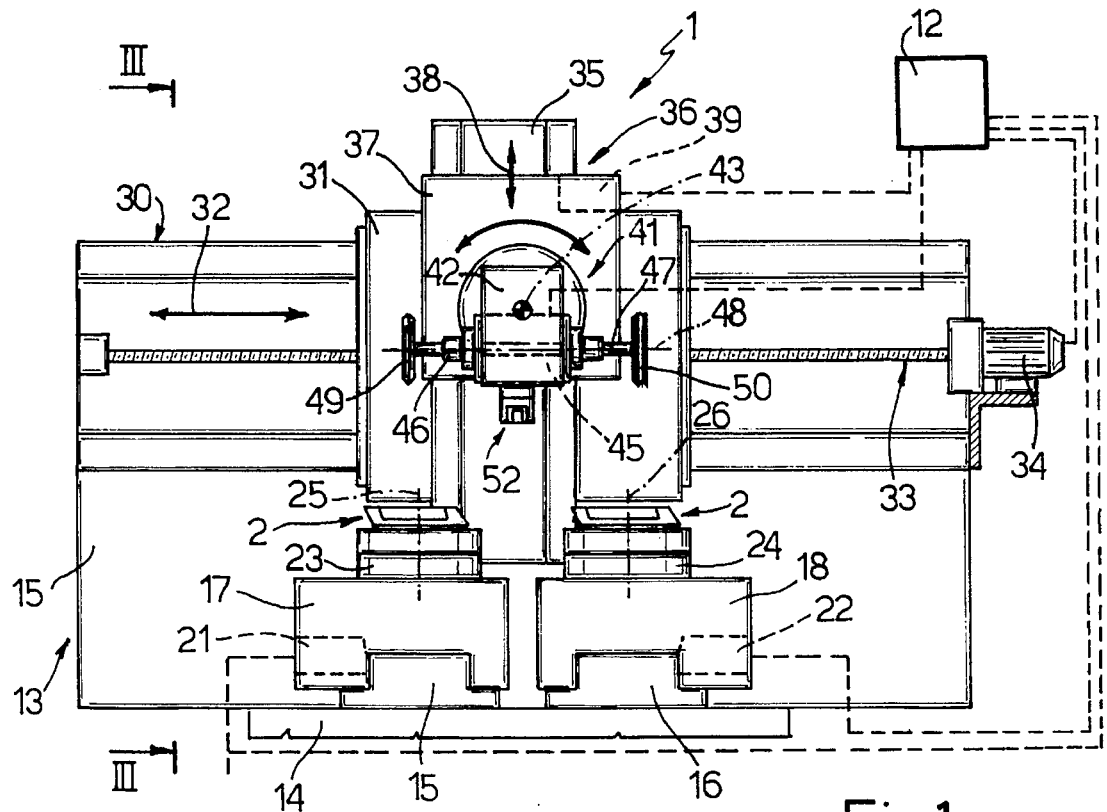
FIG. 1 is a front elevational view of a preferred embodiment of a machine for working blade sectors according to the present invention.
Figure 2:
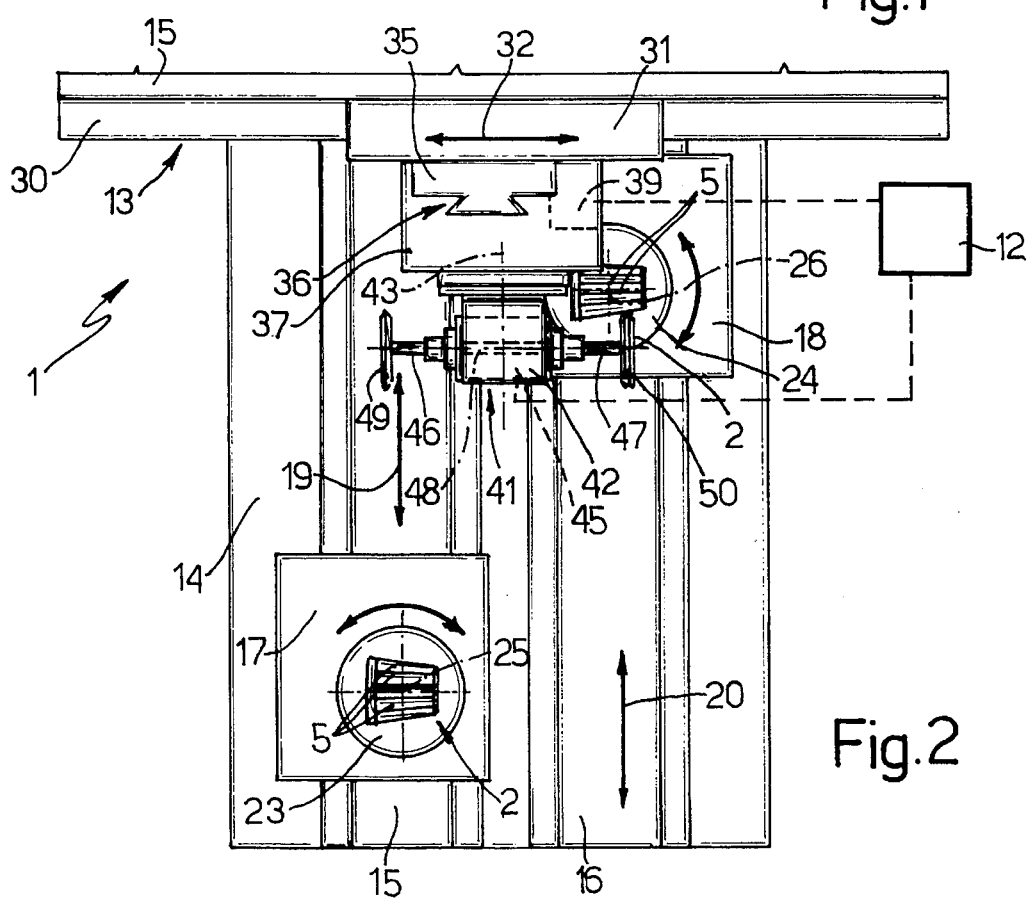
FIG. 2 is a plan view of the machine of FIG. 1.
Figure 3:
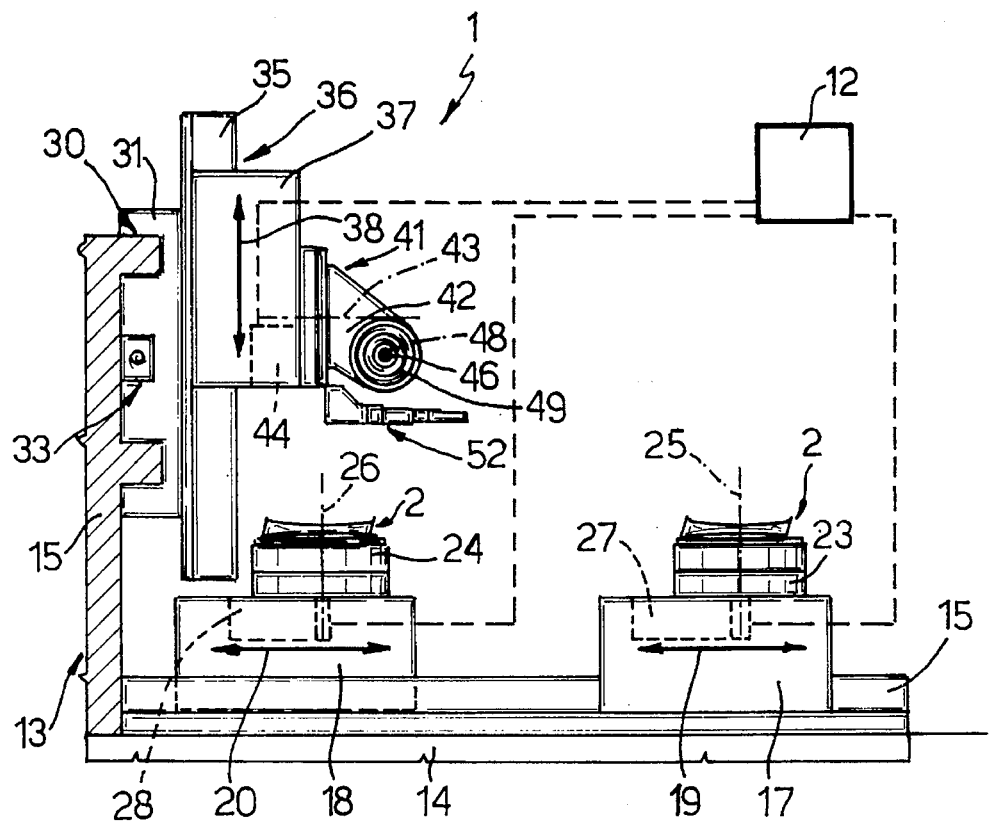
FIG. 3 is a section taken on the line III—III of FIG. 1.

In FIGS. 1 to 3, reference 1 generally indicates a machine tool for working blade sectors 2, of known type, each of which constitutes part of a blade disc 3 (FIG. 8) also known and defining its own axis 4. Each blade sector 2 comprises a plurality of radial blades 5 (FIGS. 4 to 7) and first and second peripheral circular bodies 6 and 7 arranged at axially opposite ends of the blades 5 and interconnecting respective opposite end portions of the blades 5 themselves. More particularly, with reference to FIGS. 6, 7 and 8, the bodies 6 and 7 extend circumferentially relative to the blades 5, have respective axes 8, perpendicular to the blades 5 themselves and coincident with the axis 4 of the disc 3, and have respective outer, lateral shaped surfaces 9 and 10 (FIGS. 4 to 7).

The surfaces 9 and 10 are worked by the machine 1 which operates under the control of a central electronic control unit 12 of known type and which has a framework 13 in turn including a base 14 and a vertical wall 15 projecting upwardly, perpendicular to the base 14 itself. The base 14 supports, rigidly fixed thereto, first and second straight guides 15 and 16 located adjacent each other and to which are slidably coupled respective sliding blocks 17 and 18. The sliding blocka 17 and 18 are movable along the guides 15 and 16, along parallel lines of action 19 and 20 (FIGS. 2 and 3), by means of respective actuator units 21 and 22 (FIG. 1), of known type, both controlled by the central control unit 12.

The sliding blocks 17 and 18 support respective tables 23 and 24 each of which is adapted to hold a respective blade sector 2 located centrally on the respective table 23, 24, the tables being coupled to the respective sliding block 17 and 18 for rotation about respective parallel axes 25 and 26 perpendicular to the lines of action 19 and 20 and being rotatable about the respective axes 25 and 26 by means of respective actuator units 27 and 28 (FIG. 3), of known type, both controlled by the central control unit 12.

With reference to FIGS. 1 and 3, a further straight guide 30 is fixed to the wall 15 so as to extend horizontally and a slide 31 is slidable axially thereon. The slide 31 is movable on the guide 30 along a line of action 32 perpendicular to the lines of action 19 and 20 and to the axes 25 and 26 by means of a lead-screw assembly 33 driven by a motor 34 (FIG. 1) controlled by the central control unit 12 and supports a guide 35 of a further slide-guide assembly 36. The assembly 36, in addition to the guide 35, includes a slide 37 which is slidable on the guide 35 along a line of action 38 perpendicular to the lines of action 19, 20 and 32 by means of a known transmission driven by a motor 39 (FIG. 2) also controlled by the central control unit 12.

The slide 37 in turn supports a cutting head 41 comprising a hollow body 42 coupled to the slide 37 so as to be rotatable about a horizontal axis 43 parallel to the lines of action 19 and 20 and perpendicular to the lines of action 32 and 38, the body 42 being rotatable relative to the slide 37 by means of a motor 44 (FIG. 3) controlled by the central control unit 12. The hollow body 42 houses an electric drive 45 which is controlled by the central control unit 12 and has two output shafts 46 and 47 projecting from opposite sides of the hollow body 42 coaxially with an axis 48 perpendicular to the axis 43. The shafts 46 and 47 carry respective disc tools 49 and 50, preferably grinding wheels, keyed thereto which, as illustrated in FIGS. 4 and 5, are arranged to work the respective surfaces 10 and 9 of the blade sector 2 and have respective profiles complementary to the profiles of the respective surfaces 10 and 9 themselves.

Still with reference to FIGS. 1 and 3, the head 41 includes a sensor 52 of known type which is coupled to the body 42 in a position facing the guides 15 and 16 and is connected in known manner to the central control unit 12 so that, after the blade sectors 2 have been mounted on the tables 23 and 24, it determines the actual positions of the sectors 2 themselves on the tables 23 and 24 and enables the registration of the machine 1 before the surfaces 9 and 10 are worked.

Figure 4:
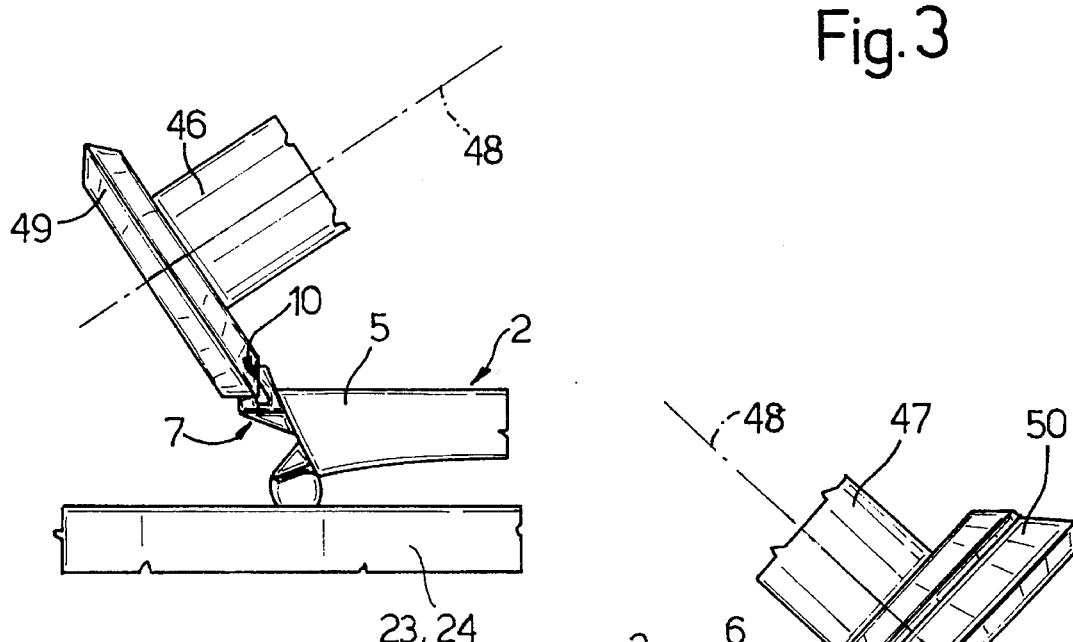
FIGS. 4 and 5 illustrate first and second details of FIG. 1 in respective operative conditions on an enlarged scale.
Figure 5:
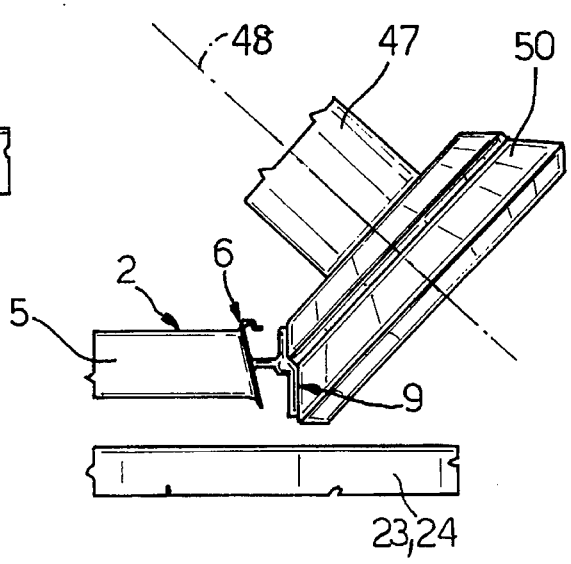
Figure 6:
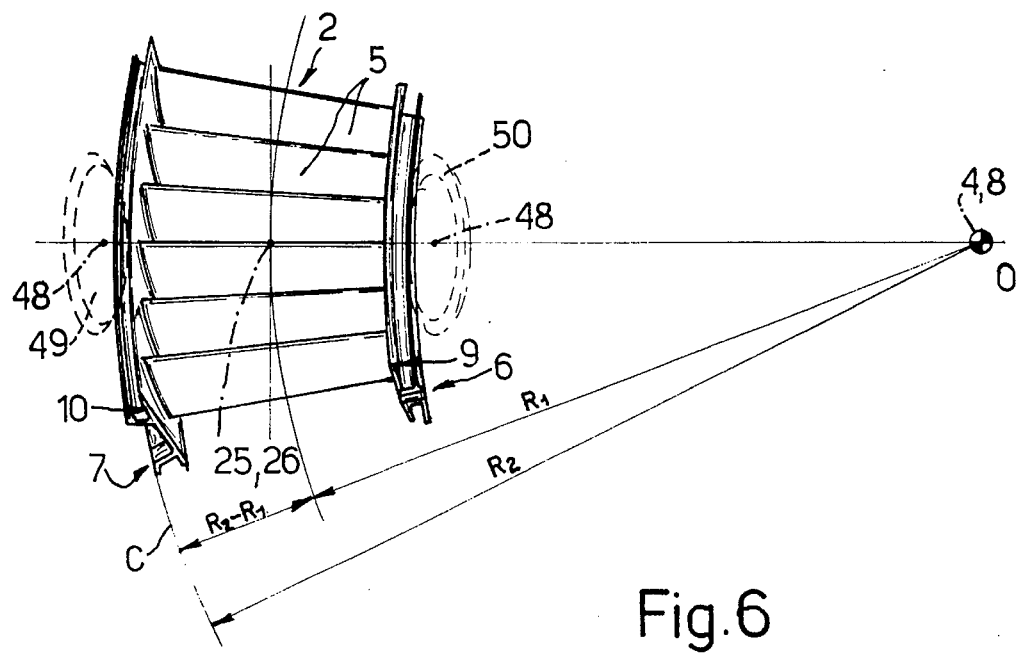
FIGS. 6 and 7 illustrate a blade sector arranged in two different positions for working.

In use, starting from the condition in which both of the tables 23 and 24 are arranged in their positions spaced from the wall 15, a blade sector 2 to be worked is mounted on the table 23; the table 23 is then moved by the unit 21 towards the wall 15 and, by actuation of the motors 34, 39 and 44, the disc tool 49 is displaced along the lines of action 32 and 38 and rotated about the axis 43 until the outer surface of the tool 49 is brought into contact with the surface 10 (FIG. 4). During the displacement of the tool 49 and of the table 23, the sensor 52 detects the position of the blade sector 2 on the table, and hence the distance R1 between the axes 8 and 25 and, by continued actuation of the motors 34 and 39 and of the units 21 and 27, a registration step is effected in which the axes 8, 25 and 48 are brought to a condition in which they are exactly coplanar (FIG. 6).

Figure 7:
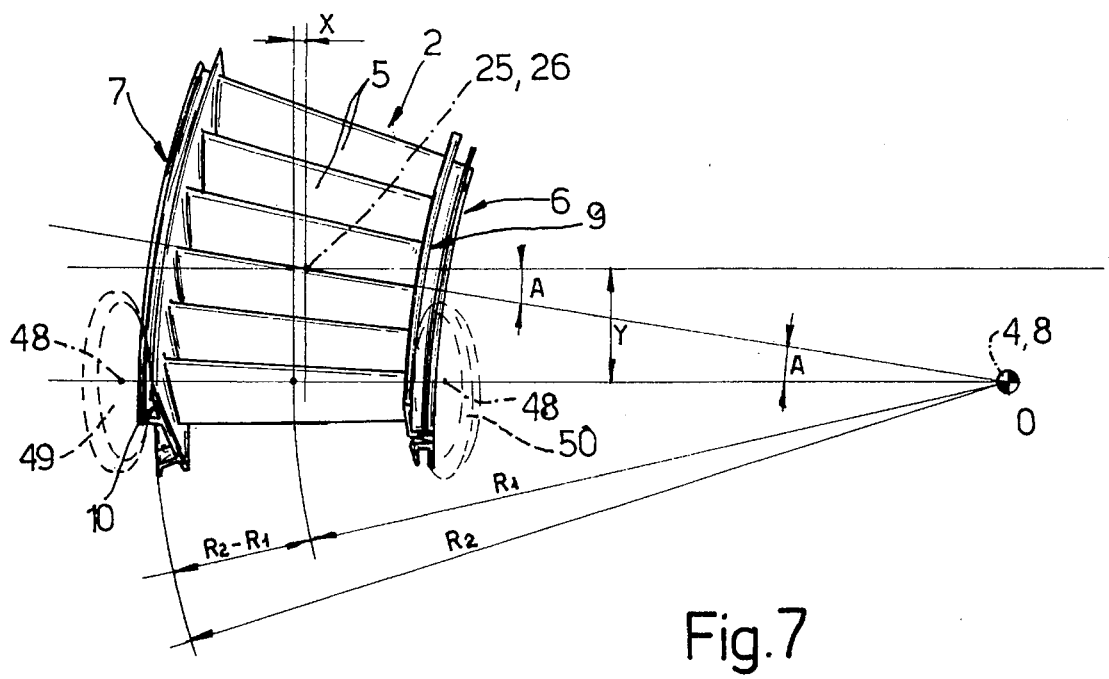
Figure 8:
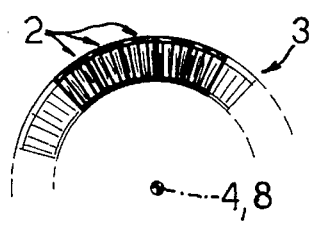
FIG. 8 illustrates a blade disc obtained by connecting a plurality of blade sectors.

At this point, the working is carried out by the movement of the point of contact of the tool 49 with the surface 10 along a circular arc C having its centre of curvature O (FIGS. 6 and 7) on the axis 8 and having a radius of curvature R2. With reference to FIGS. 6 and 7, this movement is effected by the rotation of the table 23 and hence of the blade sector 2 about the axis 25 by means of the unit 27 and by the simultaneous movement of the slide 17, and hence of the table 23 and the sector 2 fixed thereto, along the line of action 19 by actuation of the unit 21 and of the tool 49 along the line of action 32 by actuation of the motor 34 for moving the slide 31. The speed and the direction of movement of the slide 17, and hence of the sector 2 along the line of action 19 and of the tool 49 along the line of action 32 are correlated with the rotation of the table 23 about the axis 25, and are such that, during the entire working of the surface 10, the distance between the axis 8 and the instantaneous point of contact of the disc tool 49 with the lateral surface 10 remains constant and equal to R2, and the axes 8 and 48 are always coplanar with each other. More particularly, with reference to FIGS. 6 and 7, the movements of the sector 2 and of the tool 49 along the lines of action 19 and 32 respectively are linked to the rotation of the sector 2 about the axis 25 by the following equations:

$$X = R1 * (1 - \cos A)$$

$$Y = R1 * \sin A$$

where X and Y indicate the movements of the disc tool 49 along the line of action 32 and of the table 23 along the line of action 19 respectively and A indicates the angle of rotation of the sector 2 about the axis 25. From the above equations one can form the following equation by simple substitution:

$$X = (Y/\sin A) * (1 - \cos A)$$

Once the surface 10 has been worked, the head 41 is rotated about the axis 43 in the clockwise sense as seen in FIG. 1 so as to move the tool 49 away from the body 7 and bring the tool 50 close to the body 6, after which the initial registration operation is repeated and the surface 9 is worked by means of the tool 50 following the same steps as those described for the working of the surface 10.

During the working of the sector 2 disposed on the table 23, a further sector 2 to be worked is mounted on the table 24 and, immediately the sector 2 being worked has been finished, the table 24 is advanced towards the wall 15 and its mounted sector 2 is worked in accordance with the steps described for the working of the preceding sector 2.

From the explanation given above, it will be clear that the method of working just described not only enables blade sectors of any dimensions, including large sized sectors to be worked but also, since only one sector 2 at a time is worked and special tools for positioning the sector 2 itself on the tables 23 and 24 are not required, achieves a considerable saving both in production costs and in costs due to wastage of material and loss of production due to errors committed during the working of the sectors 2. Moreover, the fact that a machine 1 is used which has two tools already mounted and readily interchangeable for working the same blade sector in succession and two tables 23 and 24 each for supporting a respective sector 2 enables the period of the production cycle to be reduced considerably and hence results in a further saving in working costs.

We claim:

1. A method for working a blade sector forming part of a blade disc and including a plurality of blades and at least one circular, peripheral body connecting together corresponding ends of the blades, the circular body defining its own axis substantially perpendicular to the blades and arranged to coincide with an axis of the blade disc, the body having a lateral surface to be worked, coaxial with the said axes, the method including the steps of:

arranging a disc tool which is rotatable about its own axis in contact with the lateral surface;

rotating the blade section about a first axis distinct from the axis of the circular body but parallel to the axis of the circular body; and at the same time as the blade section is rotated, displacing the blade section and the disc tool relative to each other along two lines of action perpendicular to the first axis in such a way that a distance between the axis of the circular body and the instantaneous point of contact of the lateral surface with the disc tool is kept constant during the entire working of the lateral surface itself; and arranging the axis of rotation of the disc tool, the axis of the circular body and the first axis in mutually coplanar positions during a preliminary registration step.

2. A method according to claim 1, wherein the relative translational displacements of the disc tool and of the blade sector along the respective lines of action are effected so that, during the entire working of the lateral surface, the axis of the circular body and the axis of rotation of the disc tool are kept in mutually coplanar positions.

3. A method according to claim 1, wherein the said two lines of action are perpendicular to each other.

4. A method according to claim 1, wherein the rotation of the blade sector about the first axis is achieved by locating the blade sector itself on a worktable rotatable about its own axis coincident with the first axis and the relative translational displacement of the disc tool and of the blade sector are effected by moving the table along one of the said lines of action and the disc tool relative to the table along the other of the lines of action.

5. A method for working a blade sector of a blade disc, the blade sector including a plurality of blades and two circular bodies arranged at opposite ends of the blades, the two circular bodies having respective coincident axes which are substantially perpendicular to the blades and respective lateral surfaces to be worked coaxial with the said axes, the method including the steps of:

arranging a first one of a plurality of disc tools rotatable about a common axis in contact with a first one of the lateral surfaces;

rotating the blade section about a first axis distinct from the axes of the circular bodies but parallel to the axes of the circular bodies;

at the same time as the blade section is rotated, displacing the blade section and the first one of the plurality of disc tools relative to each other along two lines of action perpendicular to the first axis in such a way that a distance between the axes of the circular bodies and the instantaneous point of contact of the first one of the lateral surfaces is kept constant during the entire working of the first one of the lateral surfaces; and at the end of the working of the first one of the lateral surfaces, rotating a second one of the plurality of disc tools relative to the blade sector about a further axis perpendicular to the first axis and said common axis to successively work the second one of the lateral surfaces.

6. A method according to claim 1, wherein the rotation of the blade sector about the first axis and the relative translation displacements of the disc tool and of the blade sector along the said two lines of action are linked by the following equation:

$X=(Y/\sin A)*(1-\cos A)$ where X indicates the displacement of a disc tool along one rotation of the blade sector about the first axis of the lines of action, Y indicates the displacement of the blade sector along the other of the lines of action and A indicates the angle of rotation of the blade sector about the first axis.

7. A method according to claim 1, wherein the blade sector comprises two circular bodies arranged at opposite ends of the blades and having respective axes which are coincident with each other and respective lateral surfaces to be worked, the lateral surfaces being worked in succession with the use of two for the said disc tools rotatable about a common axis, at the end of the working of one of the surfaces, the disc tools being rotated relative to the blade sector about a further axis perpendicular to the first axis and the said common axis.

8. A machine for working a blade sector for forming part of a blade disc and including a plurality of blades and at least one circular peripheral body connecting together the ends of the blades, the circular body defining its own axis substantially perpendicular to the blades and arranged to coincide with an axis of the blade disc, the body having a lateral surface to be worked, coaxial with the said axes; the machine including:

a cutting head;

a disc tool keyed to a shaft of the cutting head and rotatable about its own axis;

a worktable rotatable about a first axis, the worktable being arranged to support a single blade sector to be worked, the worktable including a first slide and a second slide supporting the worktable and the cutting head respectively;

first actuator means for rotating the worktable about the first axis;

second actuator means and third actuator means for driving the first slide and the second slide along a first line of action and a second line of action respectively perpendicular to the first axis; and electronic control means for simultaneously activating and controlling all the actuator means in such a way that a distance between the axis of the circular body and the instantaneous point of contact of the lateral surface with the disc tool is kept constant during the entire working of the lateral surface itself.

9. A machine according to claim 8, wherein the lines of action of the first slide and of the second slide are perpendicular to each other.

10. A machine according to claim 8, further including a position-detector which cooperates with the electronic control means to effect a preliminary registration step in which the axis of rotation of the disc tool, the axis of the first circular body and the first axis are arranged in mutually coplanar positions.

11. A machine according to claim 8, wherein the cutting head includes two motor-driven output shafts aligned with a common axis and opposed to each other, and two of the said disc tools keyed each to a respective one of the shafts and arranged to work respective circular bodies at opposite ends of the blades, and being rotatable about a further axis perpendicular to the first axis and to the common axis.

12. A machine according to claim 8, wherein it includes two of the said work tables each for supporting a respective blade sector and each rotatable about a respective first axis; the said two tables being movable along respective first lines of action parallel to each other.

13. A method for working a blade sector forming part of a blade disc and including a plurality of blades and at least one circular, peripheral body connecting together corresponding ends of the blades, the circular body defining its own axis substantially perpendicular to the blades and arranged to coincide with an axis of the blade disc, the body having a lateral surface to be worked, coaxial with the said axes, the method including the steps of:

arranging a disc tool which is rotatable about its own axis in contact with the lateral surface;

rotating the blade section about a first axis distinct form the axis of the circular body but parallel to the axis of the circular body; and at the same time as the blade section is rotated, displacing the blade section and the disc tool relative to each other along two lines of action perpendicular to the first axis in such a way that a distance between the axis of the circular body and the instantaneous point of contact of the lateral surface with the disc tool is kept constant during the entire working of the lateral surface itself;

wherein the rotation of the blade sector about the first axis and the relative translation displacements of the disc tool and of the blade sector along the said two lines of action are linked by the following equation:

$$X=(Y/\sin A)*(1-\cos A)$$

where X indicates the displacement of a disc tool along one rotation of the blade sector about the first axis of the lines of action, Y indicates the displacement of the blade sector along the other of the lines of action and A indicates the angle of rotation of the blade sector about the first axis.

14. The method of claim 13 further including a preliminary registration step in which the axis of rotation of the disc tool, the axis of the circular body and the first axis are arranged in mutually coplanar positions.

15. The method of claim 13 wherein the blade sector comprises two circular bodies arranged at opposite ends of the blades and having respective axes which are coincident with each other and respective lateral surfaces to be worked, the lateral surfaces being worked in succession with the use of two for the said disc tools rotatable about a common axis, at the end of the working of one of the surfaces, the disc tools being rotated relative to the blade sector about a further axis perpendicular to the first axis and the said common axis.

16. The method of claim 13 wherein the relative translational displacements of the disc tool and of the blade section along the respective lines of action are effected so that, during the entire working of the lateral surface, the axis of the circular body and the axis of rotation of the disc tool are kept in mutually coplanar positions.

17. The method of claim 5 further including a preliminary registration step in which the common axis of rotation of the disc tools, the axes of the circular bodies and the first axis are arranged in mutually coplanar positions.

18. The method of claim 5 wherein the rotation of the blade sector about the first axis and the relative translation displacements of the first one of the plurality of disc tools and of the blade sector along the said two lines of action are linked by the following equation:

$$X=(Y/\sin A)*(1-\cos A)$$

where X indicates the displacement of the disc tool along one rotation of the blade sector about the first axis of the lines of action, Y indicates the displacement of the blade sector along the other of the lines of action and A indicates the angle of rotation of the blade sector about the first axis.

19. The method of claim 5 wherein the relative translational displacements of the first one of the plurality of disc tools and of the blade section along the respective lines of action are effected so that, during the entire working of the first one of the lateral surfaces, the axes of the circular bodies and the axis of rotation of the disc tool are kept in mutually coplanar positions.

20. The method of claim 5 wherein the rotation of the blade section about the first axis is achieved by locating the blade section itself on a worktable rotatable about its own axis coincident with the first axis and the relative translational displacement of the disc tool and of the blade section are effected by moving the table along one of the said lines of action and the disc tool relative to the table along the other of the lines of action.

* * * * *

UNITED STATES PATENT AND TRADEMARK OFFICE
CERTIFICATE OF CORRECTION

PATENT NO. : 5,618,222

DATED : APRIL 8, 1997

INVENTOR(S) : ANTONIO BAIMA, GIUSEPPE BORIO, MARIO BO, LEONARDO DE CARLO, AURELIO BERRUTO, ROBERTO TOLOMEI, GIANLUIGI BOSCOLO

It is certified that error appears in the above-indentified patent and that said Letters Patent is hereby corrected as shown below:

On the Title Page [75] inventors: lines 2 & 4, delete "Turin", insert --Torino--

On the title page [56] References Cited FOREIGN PATENT DOCUMENTS, delete "24575964 8/1981 France", insert --2475964 8/1981 France--

Signed and Sealed this

Fourth Day of November, 1997

*Attest:*

BRUCE LEHMAN

*Attesting Officer*      *Commissioner of Patents and Trademarks*